| (12) | United States Patent<br>Sterzing et al. | (10) Patent No.: US 8,099,181 B2<br>(45) Date of Patent: Jan. 17, 2012 |
|---|---|---|

(54) METHOD FOR THE COMPUTER-AIDED REGULATION AND/OR CONTROL OF A TECHNICAL SYSTEM, ESPECIALLY A GAS TURBINE

(75) Inventors: Volkmar Sterzing, Neubiberg (DE); Steffen Udluft, Eichenau (DE)

(73) Assignee: Siemens Aktiengesellschaft, Munich (DE)

( * ) Notice: Subject to any disclaimer, the term of this patent is extended or adjusted under 35 U.S.C. 154(b) by 391 days.

(21) Appl. No.: 12/521,144

(22) PCT Filed: Dec. 19, 2007

(86) PCT No.: PCT/EP2007/064262
§ 371 (c)(1),
(2), (4) Date: Jun. 25, 2009

(87) PCT Pub. No.: WO2008/080862
PCT Pub. Date: Jul. 10, 2008

(65) Prior Publication Data
US 2010/0070098 A1 Mar. 18, 2010

(30) Foreign Application Priority Data
Jan. 2, 2007 (DE) .......................... 10 2007 001 024

(51) Int. Cl.
G05B 13/02 (2006.01)
G06G 7/70 (2006.01)
G06G 7/00 (2006.01)
G06F 17/50 (2006.01)
G06F 15/18 (2006.01)

(52) U.S. Cl. .............. 700/47; 701/100; 703/18; 706/23; 706/25

(58) Field of Classification Search ................... 700/47; 701/100; 706/23, 25; 703/18
See application file for complete search history.

(56) References Cited

U.S. PATENT DOCUMENTS

| 5,485,545 | A | * | 1/1996 | Kojima et al. ................. 706/23 |
| 5,598,076 | A | * | 1/1997 | Neubauer et al. ......... 318/568.22 |
| 5,857,321 | A | * | 1/1999 | Rajamani et al. ............ 60/39.27 |
| 7,383,167 | B2 | * | 6/2008 | Oke ............................... 703/18 |
| 7,490,027 | B2 | * | 2/2009 | Retsina ............................ 703/2 |
| 7,660,636 | B2 | * | 2/2010 | Castel et al. ................. 607/148 |

(Continued)

FOREIGN PATENT DOCUMENTS

DE 10345440 A1 5/2005

(Continued)

OTHER PUBLICATIONS

Rumelhart et al., "Learning internal representations by error propagation", In Parallel Distributed Processing: Explorations in the Microstructure of Cognition, 1986, pp. 318-362; vol. 1, Book; Eds. Cambridge: MIT Press, GB.

(Continued)

Primary Examiner — Kidest Bahta
Assistant Examiner — Sivalingam Sivanesan

(57) ABSTRACT

A method for the computer-aided regulation and/or control of a technical system is provided. In the method, first a simulation model of the technical system is created, to which subsequently a plurality of learning and/or optimization methods are applied. Based on the results of these methods, the method best suited for the technical system is selected. The selected learning and/or optimization method is then used to regulate the technical system. Based on the simulation model, the method can thus be used to train an initial controller, which can be used as an intelligent controller, and is not modified during further regulation of the technical system.

19 Claims, 2 Drawing Sheets

U.S. PATENT DOCUMENTS

2003/0088809 A1    5/2003    Gulati et al.

FOREIGN PATENT DOCUMENTS

| | | |
|---|---|---|
| DE | 60206241 T2 | 6/2006 |
| EP | 1016981 A1 | 7/2000 |
| EP | 1543394 B1 | 5/2006 |
| EP | 1724528 A1 | 11/2006 |
| JP | 03095666 A | 4/1991 |
| JP | 05298277 A | 11/1993 |
| JP | 06314105 A | 11/1994 |
| JP | 09237260 A | 9/1997 |
| JP | 11353295 A | 12/1999 |
| WO | WO 2005081076 A2 | 9/2005 |

OTHER PUBLICATIONS

Kaelbling et al., "Reinforcement Learning: A Survey", Journal of Artificial Intelligence Research 4, 1996, pp. 237-285; Magazine.

Cheng et al., "A comparison of optimal control and stochastic programming from a formulation and computation perspective", Computers & Chemical Engineering, 2004, pp. 149-164, vol. 29, Nr. 1, Pergamon Press, Oxford, GB Magazine.

* cited by examiner

METHOD FOR THE COMPUTER-AIDED REGULATION AND/OR CONTROL OF A TECHNICAL SYSTEM, ESPECIALLY A GAS TURBINE

CROSS REFERENCE TO RELATED APPLICATIONS

This application is the US National Stage of International Application No. PCT/EP2007/064262, filed Dec. 19, 2007 and claims the benefit thereof. The International Application claims the benefits of German application No. 10 2007 001 024.0 DE filed Jan. 2, 2007, both of the applications are incorporated by reference herein in their entirety.

FIELD OF INVENTION

The invention relates to a method for computer-aided regulation and/or control of a technical system, especially a gas turbine, as well as to a corresponding computer program product.

BACKGROUND OF INVENTION

In the control of complex technical systems it is often desirable that changes to be made on the technical system are selected such that an advantageous desirable dynamic behavior of the technical system is obtained. The dynamic behavior can however often not be predicted in a simple manner in complex technical systems, so that appropriate computer-aided prediction methods are needed in order to estimate the future behavior of the technical system and to select suitable actions for regulation or control of the technical system accordingly.

Often the states of a technical system are not simple to measure and can only be described statistically on the basis of stochastic components of the system behavior. Thus, in the regulation of such technical systems, often no setpoint values or guide variables exist for a corresponding regulation as well as no corresponding target values on the mapping of which an appropriate simulation model, such as the neural network for example, can be trained. Since possible dependencies between different measured values and setpoint values of complex technical systems are often unclear, it is only possible with difficulty or by extremely long periods of observation of the dynamic behavior of the technical system to develop an optimum automatic regulation for this system.

Different methods for regulation or control and for optimization of operating points of technical systems are known from the prior art: These methods either use an analytical model for description of the technical system or they are based on preceding measurement data of the technical system or on a modeling of the technical system based on knowledge about to the system, with the modeling being undertaken example with the aid of Bayesian networks or neuro fuzzy networks.

The known methods of regulation or control of a technical system have the disadvantage that the methods for modeling the technical system often need a plurality of measurement data and also that it is not clear in advance whether the methods are suitable for the specific technical system used.

Publication EP 1 016 981 A1 shows a an apparatus for learning of an agent, with actions to be carried out on a technical system being learned with a plurality of learning modules based on reinforcement learning. Depending on prediction errors determined the actions of the individual learning modules are weighted and combined with each other accordingly.

A method for control of a technical system is known from document U.S. Pat. No. 5,485,545 A, in which the control based on recurrent neural networks is learned. Control of the voltage of a power supply system is described as a practical application.

SUMMARY OF INVENTION

The object of the invention is thus to create a method for computer-aided regulation and/or control of the technical system which, on the basis of a few measurement data, makes possible an effective and precise regulation or control of the technical system.

The object is achieved by the independent claims. Developments of the invention are defined in the dependent claims.

In the inventive method in step a) a simulation model of the technical system based on measured states of the technical system that follow each other over time is created. Subsequently in step b) a plurality of learning and/or optimization methods is applied to the simulation model created, with the learning and/or optimization method delivering as a result parameters learned in each case and a sequence of states and actions assigned to the states, and an action assigned to the state leading to a new state in the sequence of states and actions. Based on the results of the plurality of learning and/or optimization methods, one learning and/or optimization method is finally selected in step c) from the plurality of learning and/or optimization methods in accordance with predetermined criteria, with the selected method being suitable in accordance with these predetermined criteria for the regulation and/or control of the technical system. The selection of the learning or optimization method in a step c) of the inventive method is preferably undertaken in such cases as a function of an assessment which is output by the simulation model and/or which depends on the result of the respective learning or optimization method. Finally, in step d), the technical system is regulated or controlled with the selected learning and/or optimization method, with the regulation or control specifying the action to be subsequently executed on the technical system as a function of a state of the technical system.

With the inventive method a simulation model can be created even with just a few items of measurement data which is then used to determine which learning or optimization method is especially suitable for control or regulation of the system.

The learning or optimization method is thus not selected and learned directly on the actual technical system but in advance on a simulation model. In this way it is guaranteed that before the actual regulation control of the actual technical system an especially suitable learning method will be extracted. Thus errors are avoided in the actually often very complex regulation or control of the technical system. The method in this case is very flexible and can especially be supplemented in a simple manner by innovative learning or optimization methods which are taken into account in step b) of the method, The inventors have also been able to verify through corresponding experiments that the method is very good for regulation or control of a gas turbine.

In this case the inventive method can use different types of regulation or control in the step d). These different types of regulation or control can also be combined with one another. In particular a switch can be made from one type of regulation to another. In one embodiment the technical system is regulated or controlled in step d) with the selected learning method on the basis of the parameters learned in step b), with the learned parameters not being changed during the regulation or control of the technical system. In this way an initial regulator is created which is not changed during the entire regulation or control on the actual technical system. An already learned regulator is thus involved which imposes low demands on the memory requirement or on the computing power of the computer-aided method during the regulation or control.

In a variant of the inventive method the technical system is regulated or controlled with the selected learning method in step d) such that, at the beginning of the regulation or control the parameters learned in step b) are used which during the regulation of control and the help of the new states and actions produced during the regulation or control are further learned. In this way an adaptive regulator is created which continuously improves itself during the regulation or control in the actual operation of the technical system.

In a further variant of the invention it is also possible for the parameters learned with the learning and optimization method in step b) to be reset (i.e. set to a predefined, predetermined value) and to be learned anew in the regulation or control of the technical system.

In step a) of the inventive method the simulation model can be created in any given way, preferably a recurrent neural network is used for this purpose such as is described for example in the detailed description with reference to FIG. 1.

The evaluation used in the inventive method for selection of the learning and/or optimization method is preferably a measure for the quality of the learning method in relation to an evaluation or reward function. I.e. the higher the reward in accordance with a reward function is during the application of the respective learning or optimization method to the simulation model, the better the suitability of the learning or optimization method is classified for regulating the technical system.

The plurality of the learning or optimization methods applied to the simulation model comprises especially one or more reinforcement learning methods, (reinforcement learning, see also document [2]), especially table-based reinforcement learning methods. For example the learning and/or optimization methods can comprise an adaptive heuristic criticism algorithm and/or a Q-learning algorithm and/or a prioritized sweeping algorithm These algorithms are sufficiently well-known from the prior art and are thus not explained in any greater detail at this point.

In a further, especially preferred exemplary embodiment of the invention, an innovative learning method can also be contained in the plurality of the learning or optimization methods.

This learning method is embodied such that:
the dynamic behavior of the technical system is modeled with a recurrent neural network with the aid of training data comprising states determined with the simulation model and actions at a number of points in time, with the recurrent neural network being formed by at least one input layer comprising the states of the technical system and the actions executed on the technical system at the number of points in time, at least one hidden recurrent layer comprising recurrent states and a least one output layer comprising the states of the technical system at the number of points in time;

an action selection rule is learnt by the recurrent neuronal network, for a current and future point in time, being coupled to a further neural network comprising at least one input layer, at least one hidden layer comprising hidden states and a least one output layer, with the input layer of the further neural network at a respective point in time comprising at least one part of the hidden states of the recurrent neural network at the respective point in time and the output layer of the further neural network at the respective point in time comprising the action executed on the technical system at the respective point in time;

states of the technical system and assigned actions are determined by the recurrent neural network coupled to the further neural network with learnt action selection rules.

This innovative learning method is characterized by two steps, namely the learning of the dynamics of a technical system with the aid of historical data based on a recurrent neural network and then subsequently learning and optimum regulation by coupling the recurrent neural network with a further neural network.

In the inventive method a state of the technical system is mostly high-dimensional, i.e. it is characterized by a plurality of state variables in a first state space with a first dimension. Preferably the actions assigned to the states of the technical system are also characterized by a plurality of action variables.

In a further, especially preferred embodiment a respective action assigned to a state is characterized by the modification of one or more manipulated variables of the technical system. Manipulated variables in this case are setting parameters during the regulation of the technical system, with the manipulated variables preferably also able to correspond to state variables of the technical system. The modification of a state can thus if necessary also correspond to the modification of a manipulated variable.

In a preferred variant of the invention, before the execution of step b) a minimization of the first state space of the states is undertaken for at least one part of the learning or optimization method from the plurality of learning or optimization methods, which has the advantage that learning methods can also be used which usually only act on low-dimensional state spaces. The minimization of the first state space is undertaken here as follows:

The states of the first state space are modeled with a recurrent neural network comprising an input player, a recurrent hidden layer and an output layer with the aid of known states as training data, with:
i) the input layer and the output layer each being formed by the states in a first state space for the number of points in time;
ii) the recurrent hidden layer being formed by hidden states with a plurality of hidden state variables in a second state space with the second dimension, with the second dimension being lower than the first dimension.

After this minimization the respective learning or optimization method is then executed in the reduced second state space of the hidden states.

In a further embodiment of the inventive method, in step b) the states of the technical system and/or the assigned actions are discretized as a function of prespecified criteria. The result achieved by an appropriate discretization adapted to the problem can be that the states or actions of the technical system only assume those variables which are classified for the respective problem as likely to bring success.

In a further, especially preferred embodiment of the invention one or more ranges of values is defined or learnt for the states and/or the assigned actions of the technical system, within which the values of the states and/or actions must lie in the application of the learning and/or optimization method in step b). In this way a suitable exploration of the space of the states and actions is created such that no forbidden system states will be selected. This can be explicitly achieved by boundaries in the selection of the parameters, or the system can learn itself to avoid bad system states and to find out the specific location of the boundaries for the technical system.

In an especially preferred embodiment of the invention the ranges of values are learnt by a penalty signal in the application of the respective learning and/or optimization method to the simulation model in step b), with a penalty signal being all the greater, the stronger the deviation of the states and/or actions determined with the learning and/or optimization method from measured or allowed states and/or actions, with allowed states or actions being defined in advance and characterizing the preferred area of operation of the technical system.

An especially preferred area of application of the invention is the control of turbines, and in particular of gas turbines. In this case the states of the technical system and/or the actions assigned to the states comprise one or more of the following variables:

Overall power of the gas turbine; One or more pressures and/or temperatures in the gas turbine or in the vicinity of the gas turbine; Combustion chamber accelerations in the gas turbine; One or more setting parameters on the gas turbine, especially valve settings and/or fuel ratios and/or inlet guide valves.

The learning or optimization method which is applied in step b) to the simulation model can typically comprise low combustion chamber accelerations as the learning or optimization target.

As well as the method described above, the invention further relates to a computer program product with program code stored on a machine-readable medium for executing the inventive method when the program runs on a computer.

BRIEF DESCRIPTION OF THE DRAWINGS

Exemplary embodiments of the invention are explained in detail below with reference to the enclosed figures.

The figures show

DETAILED DESCRIPTION OF INVENTION

The embodiments of the inventive method described below are applicable to any given technical systems. The embodiments below are especially preferably used for a gas turbine, with the gas turbine being represented for example by a state vector comprising the following eleven state variables

| | |
|---|---|
| GtLstg = | Gas turbine power |
| PrDFi = | Pressure loss at the induction filters |
| VerdPr = | Final compressor pressure |
| VerdT = | Final compressor temperature |
| Schaufel = | inlet guide valve setting |
| DrVBr = | Pressure loss in the combustion chamber |
| PilotG = | Pilot gas adjustment valve lift |
| GasDr = | Gas pressure |
| GasT = | Gas temperature |
| AbgasT = | Exhaust gas temperature |
| BkB = | combustion chamber accelerations |

In an especially preferred embodiment the inventive method used is embodied such that the learning or optimization target is as small a value as possible of the variable BkB, which is to be equated with low combustion chamber acceleration or low vibration of the turbine.

Used as input variables in the inventive method measured values of the state variables of the technical system at different points in time. In step a) of the inventive method fees measurement values are set in order to simulate the technical system with computer support. Any methods known from the prior art can be used in this case in order to create a corresponding simulation model of the technical system. Neural networks have proved to be especially suitable in such cases.

Figure 1:
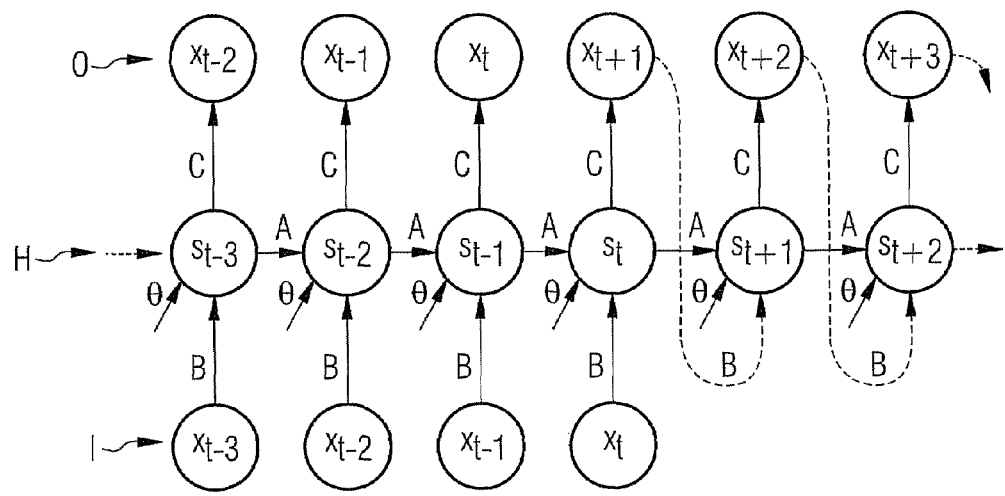
FIG. 1 a schematic diagram of a recurrent neural network which is used in an embodiment of the invention to create the simulation model of the technical system.

Described below on the basis of FIG. 1 is a method based on a recurrent neural network for creating the simulation model in step a) of the inventive method. The states of the technical system in this case are each characterized by a state in a first state space, with the first state space is having a dimension which is characterized by the number of the state variables of the states $x_t$ of the technical system at respective points in time t. In the above example relating to a gas turbine the state space involved is a space with dimension 11, since 11 state variables are present. The state $x_t$ is thus a state vector with entries of state variables of a technical system, with values of the state variables being able to be measured.

The network of FIG. 1 comprises an input layer I, which at an observed time t is formed from the corresponding state $x_t$ and past states $x_{t-1}$ $x_{t-2}$, $x_{t-3}$ etc. The states of the input layer are coupled via a matrix B to hidden states of a hidden layer H as well as to a bias/threshold value θ, with a state $x_t$ at a time t been assigned a corresponding hidden state $s_t$ at the same time in the hidden layer H. The hidden layer H in this case is a recurrent layer, in which a hidden state $s_t$ is a state vector with a predetermined number of hidden state variables, by which a state space with a second dimension will be formed in accordance with the number of hidden state variables. A state $s_t$ at a time t is coupled via matrix A and the bias θ to the state $s_{t+1}$ at the following time. The individual hidden states $s_t$ of the layer H are in their turn linked to an output layer O, which—in a similar way to input layer I—is represented by states $x_t$ of the technical system. In this case the hidden state $s_t$ is coupled at a respective point in time t to the state $x_{t+1}$ at the next point in time t+1 via a matrix C.

The recurrent neural network shown in FIG. 1 is trained with training data comprising known states of the technical system so that the dynamic timing behavior of the corresponding technical system will be modeled with a network. The recurrent network as depicted in FIG. 1 in this case represents a network with dynamically consistent temporal unfolding taking into account future states, which is referred to as a network with dynamically consistent overshooting. This means that in the network at a time t, not only states $x_t$, $x_{t-1}$, ..., etc. in the past but also future states $x_{t+1}$, $x_{t+2}$, ..., etc. will be taken into account, with the actual predictions of the network in the output layer, i.e. in FIG. 1 the states $x_{t+1}$, $x_{t+2}$ and $x_{t+3}$ being used in their turn as inputs in the network. The recurrent neural network was especially tested with 17 states in the past and with 8 future states. Indicated by dashed lines in FIG. 1 are those states of the output layer O which couple with corresponding states of the hidden layer H. In the recurrent neural network in accordance with FIG. 1 the states $x_τ$ of the system itself are thus predicted. In this way the dynamics of the underlying technical system can be modeled. Mathematically the network of FIG. 1 is represented by the following equations:

$$s_\tau = \tanh(As_{\tau-1} + Bx_\tau + \theta)$$

$$x_{\tau+1} = Cs_\tau$$

$$\sum_t \sum_\tau (x_\tau - x_\tau^d)^2 \to \min_{A,B,C,\theta}$$

The equations relate to the recurrent neural network at a point in time t, in which case at a point in time t a range of values of times τ is taken into account, with the range of values τ comprising a predetermined number m of time steps before the time t and a predetermined number of values n of time steps after the time (known as the overshooting part).

In this case the following applies $$t \in \{m, \ldots, T-n\}$$

With T representing the number of times for which training data, i.e. measured states of the technical system, is present In accordance with the above equations the matrices A, B and C as well as the bias θ are determined as parameters of the neural network, with these parameters being selected such that the quadratic error between states determined by the network $x^\tau$ and the corresponding measured states $x_\tau^d$ is minimal in accordance with the training data. This thus produces a simulated model of the technical system which can subsequently be used for executing the further steps b) through d) of the inventive method.

In step b) of the inventive method the created simulation model is used to apply a plurality of learning and/or optimization methods to this model. Optionally before the execution of step b) a method for so-called state space minimization can be used in which the number of state variables of a state vector will be reduced. This has the advantage that the number of learning and/or optimization methods which are applied to the simulation model is markedly increased since many known learning and/or optimization methods can only be used in state spaces with limited dimension. The recurrent neural network shown in FIG. 1 can also be used for state space minimization. Now however the variables of the input layer are no longer the measured states of the technical system, but the states simulated with the simulation model. State vectors $s_t$ hidden in the hidden layer H are now selected for state space minimization, the dimension of which is smaller than the dimension of the state vectors in the input layer O. The dimension is selected in this case such that it is as small as possible but still simulates the technical system sufficiently well. This can be established via the deviation of the state vectors of the input layers I from the state vectors of the output layer O. As a result the state space minimization delivers a new state space of the hidden state variables with a reduced dimension in relation to the original state space. One or more learning and/or optimization methods in accordance with step b) of the inventive method can then be applied to this reduced state space. As already mentioned, the step of state space minimization is optional and can also be omitted if necessary. Furthermore the state space minimization can be applied to just a part of the learning and/or optimization methods used in step b).

Any given type of learning and/or optimization method can be used in step b) of the inventive method, including especially learning and/or optimization methods known from the prior art such as an adaptive heuristic criticism algorithm, a Q learning algorithm or a prioritized sweeping algorithm for example. Described below is one possible learning method from a plurality of learning methods, but one which is not yet known from the prior art. This involves a learning method in which a recurrent neural network is combined with a feed-forward network. The method will be described below on the basis of FIG. 2 and FIG. 3.

The learning method described below is based on the description of the technical system on the basis of the state space X, which comprises the states $x_t$ simulated with the simulation model, and on the basis of an action space A which represents the actions $a_t$ to be executed as a function of a state $x_t$. The actions $a_t$ in this case are preferably vectors with a plurality of entries, with each entry standing for a manipulated variable on the technical system.

It is assumed that the technical system can be described with a Markov Decision Process (MDP) with a stochastic transition function P. A reward or cost function c: X×A→R exists for this process, with R representing a space of the rewards which the system receives for selecting an action $a_t$ in state $x_t$. The objective is now to determine an optimum rule Π:X→A which maximizes the expected accumulated or average reward function c for each state $x_t$. The maximization of the reward function c corresponds in this case to one possible embodiment of an action selection rule, as is described in the claims. The reward function is in particular defined so that it reflects desired characteristics of the technical system, with the optimum being reached when the function is at its maximum. In the simplest case the cost function could for example be an advantageous desired state of the technical system which is optimal when it exhibits its maximum value. It is assumed below that the technical system is a deterministic Markov Decision Process with discreet time steps, with the state spaces X and A being continuous.

Figure 2:
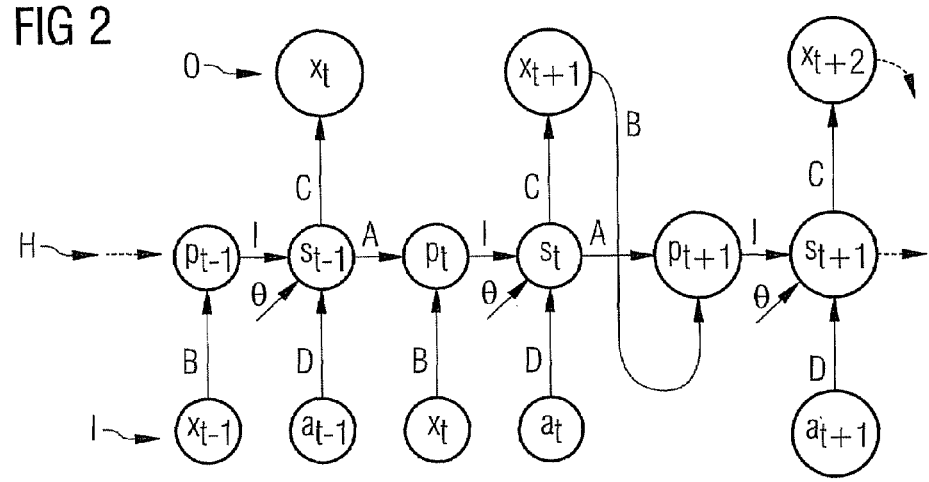
FIG. 2 a schematic diagram which shows a recurrent neural network which is employed in a learning method, which in accordance with the invention can be selected from a plurality of learning and/or optimization methods.

In the embodiment described below the Markov Decision Process is modeled with a recurrent neural network by which mapping of the dynamic behavior of the technical system, i.e. of the transmission function P(·) is undertaken by a high-dimensional non-linear system equation. The recurrent neural network RNN used in the variant of the invention described here is shown in this case in FIG. 2. The recurrent neural network comprises an input layer I which shows the states and the actions at the individual times. Shown as typical examples in FIG. 2 are the states $x_{t-1}$, $x_t$ as well as the actions $a_{t-1}$, $a_t$, $a_{t+1}$. The input layer is coupled to a hidden layer H via corresponding matrices B and D, which will be defined in greater detail below. The hidden layer features hidden States for each point in time, with FIG. 1 showing the states $p_{t-1}$, $s_{t-1}$, $p_t$, $s_t$, $p_{t+1}$ and $s_{t+1}$ as typical examples. The hidden layer H is recurrent in this case since the individual hidden states are coupled to each other which is reflected in FIG. 2 by corresponding matrices I (corresponds to the unit matrix) and A as well as by a bias θ. The recurrent neural network of FIG. 2 also features an output layer O, which is formed by the states of the technical system, with FIG. 2 depicting the states $x_t$, $x_{t+1}$ and $x_{t+2}$. These states are coupled in this diagram to the hidden states $s_{t-1}$, $s_t$ and $s_{t+1}$ by a matrix C in each case.

The neural network according to FIG. 2—like the network of FIG. 1—is a neural network with dynamically consistent overshooting. This means that in the modeling of the neural network, not only times T in the past but also times T in the future will be taken into consideration and the own predicted states of the network in the output layer will be used as inputs for future states in the input layer. The parameter τ is restricted by the length of the previous unfolding m and the length of the so-called overshooting n, so that the following applies:

$\tau \in \{t-m, \ldots, t+n\}$ for all observed times $t \in \{m, \ldots, T-n\}$, with T representing the number of available times for which training data for learning the neural network is present. The overshooting is produced from FIG. 2 by the fact that future times $\tau > t$ are also taken into account the modeling of the technical system by the neural network. Since these future times are not known, the states output via the network in the output layer will again also be used as input the next time step. This is shown in FIG. 2 for point in time t+1 at which the output state $x_{t+1}$ is once again fed to the hidden state $p_{t+1}$ of the hidden layer.

In the embodiment of the invention described here a sequence of states $x_\tau$ and actions $a_\tau$ is thus created on the input side of the recurrent neural network, with the network being unfolded in terms of time in a pre-specified interval which takes account of the past and the future. Mathematically the recurrent neural network of FIG. 1 can be described by the following equations, with the above-mentioned matrices I, A, B, C, D as well as the bias θ being contained in the equations.

$$s_\tau = \tan h(Ip_\tau + Da_\tau + \theta)$$

$$x_{\tau+1} = Cs_\tau$$

with $$p_\tau = As_{\tau-1} + Bx_\tau$$

The state is referred to here as a pre-state which aggregates the information from a previously hidden state $s_{\tau-1}$ and from the external state $x_\tau$. The non-linearity in the hidden layer is expressed here with the tangens hyperbolicus. The pre-state has the same dimension as the hidden state $s_\tau$ and is linked to this via the identity matrix I which is not learned during the training of the neural network. The hidden state $s_\tau$ has an action $a_\tau$ as its input and is used for calculating the expected next state xz+1 of the technical system. The matrix D is an additional matrix with a suitable dimension which takes account of the influence of the actions $a_\tau$ on the state $s_\tau$. The actions $a_\tau$ will also be provided to the neural network RNN as future inputs ($\tau > t$) since they do not directly influence the dynamics of the technical system and are therefore not to be learned by the network. To cover a plurality of possible states in the state space X of the technical system, the recurrent neural network for modeling the technical system should be modeled with training data in which the actions at are selected at random. Otherwise the learned dynamic can be dependent under some circumstances on a specific rule. The training data is defined in this case with the aid of the simulation model created in step a).

The aim is now to combine a neural network of FIG. 2 learnt with training data with reinforcement learning for learning the above mentioned optimum rule Π. This is achieved by the recurrent neural network of FIG. 2 being combined with a further so-called control network, by which the above reward function c will be implemented in the neural network.

In the embodiment described here the additional control network is a three-layer neural feed-forward network with an input layer, a hidden layer and an output layer. Even if further more complex topologies were possible, any given type of control function can be modeled with the model described here. Since the optimum action $a_\tau$ is to be predicted, the control network will only be coupled to the recurrent neural network for points in time lying in the future (i.e. $\tau > t$). For the preceding temporal unfolding (i.e. $\tau < t$) the actions previously listed are used in the neural network.

Figure 3:
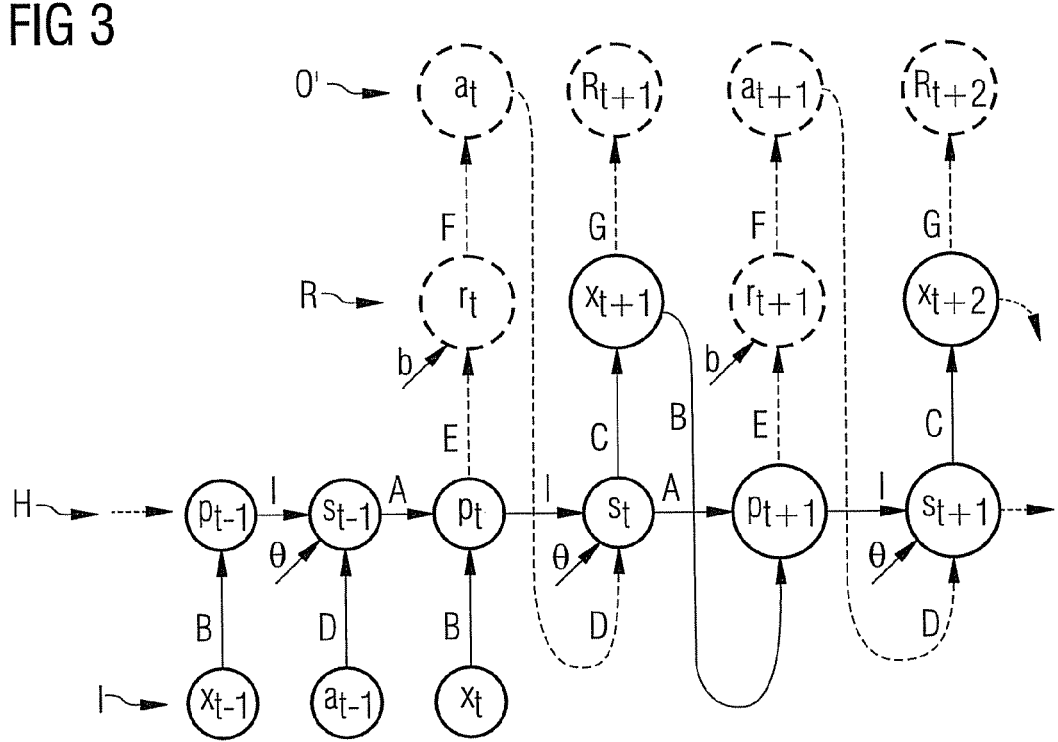
FIG. 3 a schematic diagram which reproduces the learning of an action selection rule by the recurrent neural network of FIG. 2 in combination with a feed-forward network.

FIG. 3 shows the recurrent neural network coupled to the further feed-forward network which will subsequently be referred to as the RCCN (Recurrent Control Neural Network). The parts of the network which relate to the feed-forward network are shown by dashed lines in the figure. The control network uses as its input layer the hidden states $p_t$, $p_{t+1}$, ..., etc., which are coupled by a hidden layer R to the corresponding states $r_t$, $r_{t+1}$ etc. The hidden states $r_\tau$ are coupled in this case to the states $p_\tau$ via a matrix E as well as a bias b, i.e. the following applies:

$$r_\tau = \tan h(Ep_\tau + b)$$

The hidden states $r_\tau$ are further coupled via a matrix F to the future actions $a_\tau$ to be modeled. In addition there exists a matrix G, which couples future states $x_{t+1}$, $x_{t+2}$ etc. to states $R_{t+1}$, $R_{t+2}$, with the latter being relevant states for the calculation rule.

The neural network RCNN must fulfill two different tasks. On the one hand it must identify peak dynamics of the underlying technical system and on the other it must achieve an optimum control of the technical system with the aid of a corresponding choice of actions or reward rules. The network is thus trained in two consecutive steps, namely a first step for learning the recurrent neural network with training data and a second step for learning a reward rule by coupling the recurrent neural network to a feed-forward network. This approach differs from the conventional methods in which a combined learning of both tasks is attempted in one step.

In the above the first step of the dynamics of the underlying Markov Decision Process are first modeled, which correspond to the dynamic behavior of a technical system. The network RCNN will consequently be reduced to a recurrent neural network RNN with dynamically consistent overshooting. This first step is represented mathematically by the following equations:

$$s_\tau = \tanh(Ip_\tau + Da_\tau + \theta) \qquad (1)$$

$$x_{\tau+1} = Cs_\tau \qquad (2)$$

with $$p_\tau = As_{\tau-1} + Bx_\tau \qquad (3)$$

$$\sum_t \sum_\tau (x_\tau - x_\tau^d)^2 \to \min_{A,B,C,D,\theta} \qquad (4)$$

The last equation in this case represents the task of the training, in which the results to be achieved is that a state $x_\tau$, which is defined by the recurrent neural network RNN is the best possible match for the state $x_\tau^d$ of the training data. A minimization of the quadratic error in relation to the matrices A, B, C and D and the bias θ are undertaken, which represent the parameters of the recurrent neural network to be defined.

After the first step of the modeling of the dynamics of the technical system, the matrices A, B, C and D defined in this step as well as the bias θ are recorded, i.e. their weights are not modified during further training. The matrices E and F as well as the bias b are now activated, which is shown in FIG. 3. These are the only parameters during the second step of learning the action selection rules. In this learning step the recurrent neural network does not receive any future actions as external inputs but these actions are learnt with the feed-forward network taking into consideration the reward function. In addition for previous time steps $\tau < t$ the output clusters $x_\tau$ are omitted since they are only needed for modeling the dynamics in the first step. For future time steps $\tau > t$ the error function in accordance with equation (4) is replaced by the reward or cost function c(·) which is specified further below in equation (9). This is achieved in the architecture by the additional reward cluster $R_\tau$ which is linked to the output clusters by a problem-specific fixed matrix G, which depends on the above-mentioned reward function c(·), as well as the possible activation function h within the output cluster $X_\tau$. Thus the reward function c(·) is encoded by the network RCNN within the neural architecture. This means that the reward cluster $R_\tau$ does not only have to be calculated on the basis of the output cluster $X_\tau$ but that it can also be described more generally, which also makes possible more complicated network architectures. For example the reward function can be explicitly learnt, which is especially helpful when c(·) is not known or is only specified incompletely. This can be achieved by a further additional three-layer neural network with the output of the RCNN as inputs.

The weights of the feed-forward network are only adapted in accordance with the back-propagated reward of the reward clusters $R_\tau$ (τ>t). This corresponds to the idea that the second step of learning the action selection rule not only serves to identify the dynamics but also only to learn a rule which maximizes the reward with the dynamics of the system already having been modeled beforehand.

The second step of learning the action selection rules can be reproduced mathematically by the following equations (5) to (9). In these the matrices E and F as well as the bias b are learnt. The equations (5) to (9) are as follows:

$$s_\tau = \tanh(Ip_\tau + Da_\tau + \theta) \quad (5)$$

$$R_{\tau+1} = Gh(Cs_\tau) \text{ for all } \tau > t \quad (6)$$

with $$p_\tau = As_{\tau-1} + Bx_\tau \quad (7)$$

and $$a_\tau = f(F\tanh(Ep_\tau + b)) \text{ for all } \tau > t \quad (8)$$

$$\sum_t \sum_{\tau>t} c(R_\tau) \to \min_{E,F,b} \quad (9)$$

Both in the modeling of the dynamics of the technical system in accordance with the equation (1) to (4) and also in the learning of the action selection rules in accordance with equations (5) to (9) the recurrent neural network will be trained with the same training patterns T and with a back propagation method sufficiently known from the prior art in accordance with publication [1]. Each training pattern T in this case corresponds to a point in time to which are assigned corresponding training data in the form of the state of the technical system and the action carried out at this point in time. The step of learning the action selection rules can be viewed here as backwards propagation of the error of the reward function c(·).

The embodiment of the recurrent control neural network RCNN described above combines in an ideal manner the advantages of a recurrent neural network RNN with dynamic overshoots for identification of the dynamics with a three-layer neural control network for learning the action selection rules. In this way a high approximation accuracy is reached and dynamic systems can also be controlled in a very data-efficient manner. In addition the system can be scaled in a simple manner to higher dimensions and an only partially observable environment of states of the technical system can be reconstructed. In addition very good continuous state spaces and action spaces can be processed with the network.

A variant of a learning method has been described above which represents one learning method out of a plurality of the learning methods which are employed in step b) of the inventive method to the created simulation model. At least one further learning method is applied to the created simulation model with this learning method being able to be any given learning methods known from the prior art for example, such as a table-based reinforcement learning method.

In a step c) of the inventive method a suitable method is now selected in accordance with predetermined criteria from the learning or optimization methods used. The predetermined criteria are for example corresponding reward functions in the individual learning methods, especially the minimum value of the summed cost functions in accordance with equations (9) for the learning function described there. The learning method which has the smallest minimum value of such a summed cost function will be identified as the best suited learning method in step c). The predetermined criteria can also be defined for example so that a number of actions based on the learning method learned in step b) are executed and it is subsequently assessed which learning method has led to the smallest average reward averaged over all actions carried out.

After the selection of the best suited learning method, finally in step d), the regulation or control of the real technical system is undertaken with this selected learning or optimization method. The learning or optimization method in this case, for a predetermined state of the technical system, delivers the actions subsequently to be undertaken on the technical system, which leads to a new state for which then in turn the next action to be carried out can be identified with the learning or optimization method.

In such cases there are different variants of the regulation or of the control. The learning or optimization methods selected in step c) can be learned for example as an initial regulator. I.e. the parameters learned on the basis of the simulation model with the selected learning or optimization method are used right from the start in the regulation of the technical system. Alternately it is also possible for the learned parameters of the selected learning or optimization method to be reset and subsequently the selected learning or optimization method to be learned anew from the start on the real technical system. Likewise, starting from the already learned parameters during the regulation and/or control of the real technical system, the learning process can be continued and the parameters further improved with reference to the real technical system. In precisely the same way it is possible for the parameters not to be changed any more during the control of the real technical system.

The result of the learning process of the inventive method can thus on the one hand be a fully learned regulator which is not subsequently changed any further and therefore imposes very much lower demands in respect of memory requirement and computing power than during the learning process. On the other hand the result can also be a regulator which is continuously further improved by permanent learning or which adapts itself by permanent learning to changes in the process or the objective. Changes in the process can in such cases be the ageing effects, seasonal influences, or in the example of the gas turbine, slow changes in the gas quality or in the gas composition. Changes in the objectives can be caused by changes to the individual process costs and process profits as example with gas turbines increased costs of emissions compared to the profits of the electricity produced.

The inventive method features a series of advantages. By the optimization of the regulation of a technical system by an automatic learning method, e.g. a reinforcement learning method, it is no longer necessary to regulate the technical system manually. This has the advantage that the method is in a position to resolve a even very complex, highly dimensional and especially stochastic processes only parts of which are able to be grasped by human beings. In addition the selection of the suitable learning or optimization method runs autonomously on a simulation model and is thus associated with significantly lower outlay than learning on a real technical system. In a preferred embodiment allowed ranges of values are defined or learned for the states or actions which are accepted with the learning or optimization method during learning. A state or an action which lies outside the range of values represents a forbidden system state. This can be taken into account for example by a corresponding penalty signal during learning. In this way an explicit exploration of the state space is guaranteed which contributes to the database on which the regulation method is learned in advance being optimized to the task to be resolved. By using parameters already learnt in the regulation or control of the actual technical system, rapid deployment and secure operation of the method is guaranteed. By using specific methods such as the minimization of the state space described above or the direct neural modeling with the neural network RCNN described above, the regulation or control of complex technical systems, such as a gas turbine regulation for example, is made possible.

LITERATURE REFERENCES

[1] D. E. Rumelhart, G. E. Hinton, and R. J. Williams, "Learning internal representations by error propagation", in Parallel Distributed Processing: Explorations in The Microstructure of Cognition, D. E. Rumelhart and J. L. M. et al., Eds. Cambridge: MIT Press, 1986, vol. 1, pp. 318-362

[2] Leslie Pack Kaelbling; Michael L. Littman; Andrew W. Moore, Reinforcement Learning: A Survey, Journal of Artificial Intelligence Research 4 (1996) pp. 237-285

The invention claimed is:

1. A method for a computer-aided regulation and/or a control of a technical system, comprising:
creating a simulation model of the technical system using a first plurality of states of the technical system, each consecutive state occurring later than a previous state;
applying a plurality of learning and/or optimization methods to the simulation model, the plurality of learning and/or optimization methods delivering a learned parameter and a sequence of states as a result in each case, the first plurality of states delivering a first plurality of actions, and wherein an action is assigned to a state leading to a new state in the sequence;
selecting a learning and/or optimization method from the plurality of learning and/or optimization methods for the regulation of the technical system using the results of the plurality of learning and/or optimization methods in accordance with a predetermined criteria, the selection of the learning and/or optimization method is a function of an evaluation of each learning and/or optimization method, and the evaluation is output by the simulation model and/or is determined using the result of the respective learning and/or optimization method; and
regulating the technical system with the selected learning and/or optimization method, wherein the regulation specifies a subsequent action to be performed on the technical system as a function of the state of the technical system.

2. The method as claimed in claim 1,
wherein the regulating uses the selected learning and/or optimization method on the basis of the learned parameter, and
wherein the learned parameter is not changed during the regulating of the technical system.

3. The method as claimed in claim 1,
wherein the learned parameter is used at a beginning of the regulating, and
wherein during the regulating the learned parameter is recalculated using the new state and the action produced during the regulating.

4. The method as claimed in claim 1, wherein the learned parameter is reset to a predetermined value and then recalculated during the regulating.

5. The method as claimed in claim 1, wherein the simulation model is created using a recurrent neural network.

6. The method as claimed in claim 1, wherein the evaluation is a measure of a quality of the learning and/or optimization method in relation to a second evaluation or a reward function.

7. The method as claimed in claim 1, wherein the plurality of learning and/or optimization methods applied to the simulation model, comprising:
a reinforcement learning method, comprising:
modeling a dynamic behavior of the technical system with the recurrent neural network using training data including the first plurality of states and the first plurality of actions determined by the simulation model at a plurality of different times;
learning an action selection rule by the recurrent neural network for a current time and a future time and coupling the recurrent neural network to a second neural network; and
determining the first plurality of states and the first plurality of actions by the recurrent neural network and coupling the recurrent neural network to the second neural network using a plurality of learned action selection rules,
wherein the recurrent neural network is formed by a first input layer including the first plurality of states and the first plurality of actions performed on the technical system for the plurality of times, a first hidden recurrent layer including a first plurality of hidden states, and a first output layer including the first plurality of states for the plurality of different times,
wherein the second neural network includes a second input layer, a second hidden layer including a second plurality of hidden states, and a second output layer, and
wherein the second input layer at a point in time including a part of the first plurality of hidden states at the point in time and the second output layer including the action performed on the technical system at the point in time.

8. The method as claimed in claim 7, wherein the reinforcement learning method is a table-based reinforcement learning method.

9. The method as claimed in claim 1, wherein the plurality of the learning and/or optimization methods applied to the simulation model includes an adaptive heuristic criticism algorithm and/or a Q learning algorithm and/or a prioritized sweeping algorithm.

10. The method as claimed in claim 1, wherein the state of the technical system includes a plurality of state variables in a first state space with a first dimension and/or the action assigned to the state includes a plurality of action variables.

11. The method as claimed in claim 10, wherein a minimization of the first state space is done before the applying for a part of each learning and/or optimization method,
- wherein the minimization of the first state space includes modeling the first plurality of states using the recurrent neural network with an aid of training data,
- wherein the recurrent neural network includes a first input layer, a first recurrent hidden layer and a first output layer,
- wherein the first input layer and the first output layer are formed by the first plurality of states in the first state space for a plurality of points in time,
- wherein the first recurrent hidden layer is formed by a first plurality of hidden states, with a plurality of hidden state variables in a second state space with a second dimension, with a second dimension being lower than a first dimension, and
- wherein after the minimization the respective learning and/or optimization method is executed in a reduced second state space of the plurality of the hidden states.

12. The method as claimed in claim 1, wherein a change to a manipulated variable of the technical system causes a change to the action assigned to the state.

13. The method as claimed in claim 1, wherein the applying further comprises discretizing the first plurality of states and/or the first plurality of actions as a function of a prespecified criteria.

14. The method as claimed in claim 1, wherein during the applying a range of values is defined for the first plurality of states and/or the corresponding first plurality of actions.

15. The method as claimed in claim 14,
- wherein during the applying the range of values are realized by a penalty signal in an application of the respective learning and/or optimization method to the simulation model,
- wherein a strength of the penalty signal corresponds with an increase in a deviation of the first plurality of states and/or a first plurality of actions, defined from the learning and/or optimization method, to a plurality of measured or allowed states and/or plurality of measured or allowed actions.

16. The method as claimed in claim 1,
- wherein a gas turbine is regulated using the method, and
- wherein the first plurality of states and/or the first plurality of actions assigned to the states comprise at least one variable selected from the group consisting of overall power of the turbine, a pressure in the gas turbine, the pressure in a vicinity of the gas turbine, a temperature in the gas turbine, the temperature in the vicinity of the gas turbine, a combustion chamber acceleration in the gas turbine, a setting parameter on the gas turbine, and any combination thereof.

17. The method as claimed in claim 16, wherein the plurality of learning and/or optimization methods applied to the simulation model include a low combustion chamber acceleration as a learning target and/or as an optimization target.

18. The method as claimed in claim 1, wherein the technical system is a gas turbine.

19. A computer program product with program code stored on a machine-readable medium, when the program executes on a processor of a computer, the program comprising:
- creating a simulation model of a technical system using a first plurality of states of the technical system, each consecutive state occurring later than a previous state;
- applying a plurality of learning and/or optimization methods to the simulation model, the plurality of learning and/or optimization methods delivering a learned parameter and a sequence of states as a result in each case, the first plurality of states delivering a first plurality of actions, and wherein an action is assigned to a state leading to a new state in the sequence;
- selecting a learning and/or optimization method from the plurality of learning and/or optimization methods for the regulation of the technical system using the results of the plurality of learning and/or optimization methods in accordance with a predetermined criteria, the selection of the learning and/or optimization method is a function of an evaluation of each learning and/or optimization method, and the evaluation is output by the simulation model and/or is determined using the result of the respective learning and/or optimization method; and
- regulating the technical system with the selected learning and/or optimization method, wherein the regulation specifies a subsequent action to be performed on the technical system as a function of the state of the technical system.

* * * * *